US008184317B2

(12) United States Patent
Okamoto

(10) Patent No.: US 8,184,317 B2
(45) Date of Patent: May 22, 2012

(54) INTERNET FACSIMILE APPARATUS, COMMUNICATION PROCESSING METHOD AND COMMUNICATION PROCESSING PROGRAM

(75) Inventor: Tomoyuki Okamoto, Suita (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1158 days.

(21) Appl. No.: 11/652,050

(22) Filed: Jan. 11, 2007

(65) Prior Publication Data

US 2007/0177199 A1    Aug. 2, 2007

(30) Foreign Application Priority Data

Feb. 2, 2006    (JP) .................................. 2006-025887

(51) Int. Cl.
*G06F 3/12*    (2006.01)
*H04N 1/00*    (2006.01)
*H04N 1/32*    (2006.01)
(52) U.S. Cl. ........................ 358/1.15; 358/468; 358/434
(58) Field of Classification Search .................. 358/1.15, 358/1.13, 1.1, 402, 405, 468, 442, 434, 435, 358/436, 444; 379/100.1
See application file for complete search history.

(56) References Cited

U.S. PATENT DOCUMENTS

| | | | |
|---|---|---|---|
| 6,385,655 B1 * | 5/2002 | Smith et al. .................... 709/232 |
| 6,396,592 B1 * | 5/2002 | Okada et al. ................. 358/1.15 |
| 6,437,871 B1 | 8/2002 | Yuki | |
| 6,437,873 B1 * | 8/2002 | Maeda .......................... 358/1.15 |
| 6,650,440 B1 * | 11/2003 | Wing ............................. 358/402 |
| 6,717,688 B1 | 4/2004 | Ogawa | |
| 6,772,216 B1 * | 8/2004 | Ankireddipally et al. ..... 709/230 |
| 6,880,019 B1 * | 4/2005 | Toyoda .......................... 709/238 |
| 6,897,973 B1 * | 5/2005 | Brookner et al. ............ 358/1.15 |
| 6,907,112 B1 * | 6/2005 | Guedalia et al. ........... 379/88.17 |
| 7,199,906 B1 * | 4/2007 | Tamura .......................... 358/400 |
| 7,293,062 B2 * | 11/2007 | Masao et al. .................. 709/206 |
| 7,447,739 B1 * | 11/2008 | Cunetto et al. ................ 709/204 |
| 7,602,517 B2 * | 10/2009 | Tamura ........................ 358/1.15 |
| 7,623,257 B2 * | 11/2009 | Chase et al. ................. 358/1.15 |
| 7,630,360 B2 * | 12/2009 | Schneider et al. ............ 370/352 |

(Continued)

FOREIGN PATENT DOCUMENTS

JP    H10-058800    3/1998

(Continued)

OTHER PUBLICATIONS

Notification of Reasons for Refusal dated Apr. 22, 2008 issued in corresponding Japanese Patent Application No. 2006-025887, and English-language translation.

*Primary Examiner* — Madeleine A Nguyen
(74) *Attorney, Agent, or Firm* — Buchanan Ingersoll & Rooney PC

(57) ABSTRACT

An Internet facsimile apparatus includes a network communication unit for communicating with an external apparatus in direct SMTP via a network; a printing unit for printing image data received through the network communication unit from the external apparatus; and a response mode selecting unit for selecting between setting a first response mode to send a response right after image data reception acknowledging reception of the image data and setting a second mode to send a response after image data printing is completed when image data sent by direct SMTP communication is received through said network communication unit.

18 Claims, 7 Drawing Sheets

U.S. PATENT DOCUMENTS

| | | | |
|---|---|---|---|
| 7,643,167 B2* | 1/2010 | Tashiro et al. | 358/1.15 |
| 7,764,392 B2* | 7/2010 | Kumakura | 358/1.15 |
| 7,791,748 B2 | 9/2010 | Izumi et al. | |
| 7,809,855 B2* | 10/2010 | Stark et al. | 709/238 |
| 7,826,102 B2* | 11/2010 | Nakamura | 358/407 |
| 2002/0019876 A1* | 2/2002 | Akimoto et al. | 709/230 |
| 2002/0075506 A1* | 6/2002 | Stevenson et al. | 358/1.15 |
| 2002/0104026 A1* | 8/2002 | Barra et al. | 713/202 |
| 2002/0120700 A1 | 8/2002 | Tamura | |
| 2002/0178211 A1* | 11/2002 | Singhal et al. | 709/201 |
| 2002/0181016 A1* | 12/2002 | Al-Kazily et al. | 358/1.15 |
| 2003/0058277 A1* | 3/2003 | Bowman-Amuah | 345/765 |
| 2003/0115544 A1* | 6/2003 | Henry et al. | 715/500 |
| 2003/0187939 A1* | 10/2003 | O'Brien | 709/206 |
| 2004/0010395 A1* | 1/2004 | Bando et al. | 702/188 |
| 2004/0078340 A1* | 4/2004 | Evans | 705/64 |
| 2004/0097188 A1* | 5/2004 | Tanimoto | 455/3.06 |
| 2004/0186925 A1* | 9/2004 | Cooper et al. | 710/8 |
| 2005/0071500 A1* | 3/2005 | Tonegawa | 709/236 |
| 2005/0073665 A1* | 4/2005 | Taniguchi et al. | 355/53 |
| 2005/0216492 A1* | 9/2005 | Singhal et al. | 707/100 |
| 2005/0225809 A1* | 10/2005 | Tonegawa | 358/402 |
| 2006/0017965 A1* | 1/2006 | Tonegawa | 358/1.15 |
| 2006/0050296 A1* | 3/2006 | Suto | 358/1.15 |
| 2006/0158681 A1* | 7/2006 | Yorimoto et al. | 358/1.15 |
| 2006/0192994 A1* | 8/2006 | Tanimoto | 358/1.15 |
| 2006/0276196 A1* | 12/2006 | Jiang et al. | 455/446 |
| 2007/0041530 A1* | 2/2007 | Tanimoto et al. | 379/93.24 |
| 2007/0046981 A1* | 3/2007 | Sekiguchi | 358/1.15 |
| 2007/0086438 A1* | 4/2007 | Schneider et al. | 370/352 |
| 2010/0171985 A1* | 7/2010 | Tonegawa | 358/1.15 |

FOREIGN PATENT DOCUMENTS

| | | |
|---|---|---|
| JP | H11-252343 | 9/1999 |
| JP | 2000-270151 | 9/2000 |
| JP | 2001-036684 | 2/2001 |
| JP | 2001-111628 | 4/2001 |
| JP | 2002-027193 | 1/2002 |
| JP | 2002-152482 | 5/2002 |
| JP | 2002-218151 | 8/2002 |
| JP | 2003-218941 | 7/2003 |
| JP | 2004-172938 | 6/2004 |
| JP | 2004-247841 | 9/2004 |
| JP | 2005-080025 | 3/2005 |
| JP | 2005-275811 | 10/2005 |

* cited by examiner

INTERNET FACSIMILE APPARATUS, COMMUNICATION PROCESSING METHOD AND COMMUNICATION PROCESSING PROGRAM

The present application claims priority under 35 U.S.C. §119 to Japanese Unexamined Patent Application No. 2006-25887 filed on Feb. 2, 2006, and the disclosure is hereby incorporated by reference herein in its entirety.

BACKGROUND OF THE INVENTION

1. Field of the Invention

The present invention relates to an Internet facsimile apparatus for use in image forming apparatuses such as MFP (Multi Function Peripherals) having a plurality of functions such as copying, printing, facsimile, scanning, data communication etc., and a communication processing method for use in the apparatus, and a communication processing program stored on a computer readable medium for making a computer in the apparatus execute a communication process.

2. Description of the Related Art

The following description sets forth the inventor's knowledge of related art and problems therein and should not be construed as an admission of knowledge in the prior art.

A method called direct SMTP (Simple Mail Transfer Protocol) allowing direct communication among apparatuses was developed recently for image-forming apparatuses such as MFP, by applying a method called Internet facsimile of communicating, for example, image data by e-mail.

In addition, Japanese Unexamined Laid-open Patent Publication 2004-172938 discloses a method of transforming protocols for making it possible to communicate facsimiles among facsimile apparatuses connected to the Internet and facsimile apparatuses connected to an analog public network in extended direct SMTP by using an e-mail protocol, recognizing the communication mode which a communication terminal can use, and communicating data in the recognized communication mode.

In communication among the Internet facsimile apparatuses in the direct SMTP, a response indicating successful data reception is returned to the sender when an image data is sent after DATA command. There are two main types of response mode depending on responding timing: "Quick Response" for sending a response right after data reception is completed and "Post-processing Response" for sending a response after data printing or data decoding for printing is completed.

An Internet facsimile apparatus of said "Quick Response" needs to comprise a high-capacity recording unit such as a hard disk (HDD) in which received data can be spooled. But, it is strong in multisession and it is an advantage that a plurality of printing jobs can be received at the same time.

Meanwhile, as for an internet facsimile apparatus of the "Post-processing Response", it is an advantage that a sender can recognize successful transmission as well as successful printing at the same time from receiver's response.

However, there was a concern that communication between sender and receiver apparatuses different in the timing of the response after image data reception might cause a sense of incompatibility in operation. For example, when the sender is a "Post-processing Response" apparatus and the receiver is an "Quick Response" apparatus, even when the sender recognizes correct transmission by the Quick Response from the receiver, a decoding error may occur during printing.

In addition, the art disclosed in the Patent Publication above demands more units, such as a converting unit for converting e-mail protocol and thus, has a problem that the configuration becomes more complicated. Further, the art could not satisfy all use environments required by respective users, for example, who values multisession and who values only one session to complete printing.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

An object of the present invention is to provide a user-friendly Internet facsimile apparatus, which enables not only sending/receiving image data without a sense of incompatibility but also satisfying all use environments required by respective users, when direct SMTP communication is performed between a sender and a receiver that respectively send a response in different timings after data reception.

Another object of the present invention is to provide a communication processing method for use in the apparatus.

Yet another object of the present invention is to provide a communication processing program stored on a computer readable medium for making a computer in the apparatus execute a communication process.

According to a first aspect of the present invention is an Internet facsimile apparatus, comprising:
a network communication unit for communicating with an external apparatus in direct SMTP via a network;
a printing unit for printing image data received through said network communication unit from the external apparatus; and
a response mode selecting unit for selecting/setting either "Quick Response mode" to send a response right after image data reception or "Post-processing Response mode" to send a response after image data printing is completed when image data sent by direct SMTP communication is received through said network communication unit.

According to a second aspect of the present invention is a communication processing method, comprising the steps of:
communicating with an external apparatus in direct SMTP via a network;
printing image data received from the external apparatus by the direct SMTP communication; and
selecting/setting either "Quick Response mode" to send a response right after image data reception or "Post-processing Response mode" to send a response after image data printing is completed when image data sent by direct SMTP communication is received.

According to a third aspect of the present invention is a communication-processing program stored on a computer readable medium for making a computer execute the steps of:
communicating with an external apparatus in direct SMTP via a network; printing image data received from the external apparatus by the direct SMTP communication; and
selecting/setting either "Quick Response mode" to send a response right after image data reception or "Post-processing Response mode" to send a response after image data printing is completed when image data sent by direct SMTP communication is received.

The above and/or other aspects, features and/or advantages of various embodiments will be further appreciated in view of the following description in conjunction with the accompanying FIGS. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims

BRIEF DESCRIPTION OF THE DRAWINGS

The preferred embodiments of the present invention are shown by way of example, and not limitation, in the accompanying figures, in which.

DETAILD DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

First, a schematic diagram showing a configuration of an Internet facsimile apparatus will be described with reference to FIG. 1.

Figure 1:
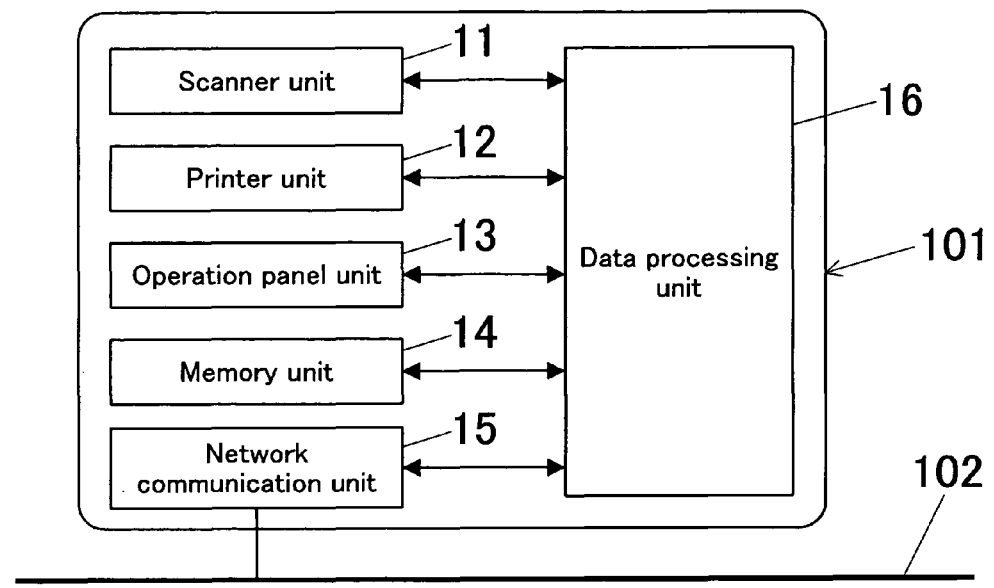
FIG. 1 is a schematic diagram showing a configuration of an Internet facsimile apparatus as one embodiment of the present invention.

In FIG. 1, an Internet facsimile apparatus 101 is connected via a network 102, to another Internet facsimile apparatus 101 and other apparatuses not shown in the Figure.

The network 102 is a network, for example a local area network (LAN) that is constructed in a place such as an office, based on the interface like 10/100BASE-T or 1000BASE-T.

In the present embodiment, the Internet facsimile apparatus 101 comprises MFP, i.e. an image forming apparatus having a plurality of functions such as copying, printing, facsimile, scanning, data communication etc. The Internet facsimile apparatus 101 comprises a scanner unit 11, a printer unit 12, an operation panel unit 13, a memory unit 14, a network communication unit 15 and a arithmetic processing unit 16 to send/receive image data by Direct SMTP to/from a counterpart communication apparatus via the network 102.

The scanner unit 11 reads an original sheet at a predetermined resolution and convert the readout data into electronic data (image data) after predetermined image processing, and it comprises a light source, a prism, and CCD not shown in Figure.

The printer unit 12 has a function to output the electronic data such as a printing job on a sheet, and it has, for example, an electrophotographic, inkjet, or thermal-transfer mechanism not shown in the Figure.

Figure 8:
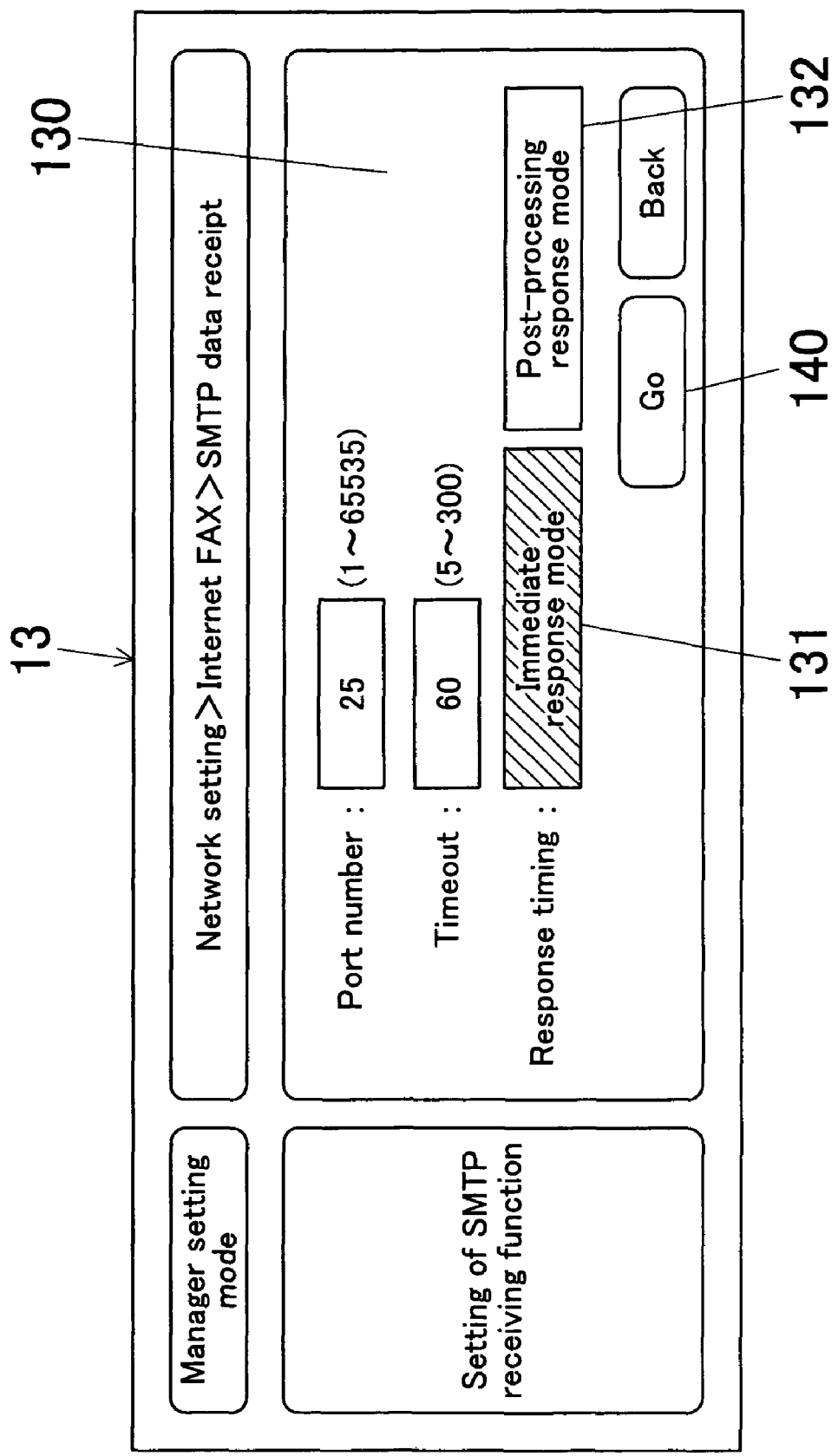
FIG. 8 is a schematic diagram showing a screen of an operation panel for inputting a response mode by a user.

The operation panel unit 13 has a mechanism (not shown in the Figure) allowing the user to input instructions, and has a display unit for displaying messages for the user, i.e. a touch panel 130 that is equipped with liquid crystal for example, according to FIG. 8.

Shown on the screen 130 in FIG. 8 are a mode selection button 131 for the user to select "Quick Response" mode to send a response right after data reception is completed, a mode selection button 132 for the user to select "Post-processing Response" mode to send a response after data printing is completed, when the data sent after DATA command by direct SMTP communication is received through the network communication unit, a setting button 140 for confirming the selection, and others. The shaded portion in FIG. 8 indicates that the mode selection button 131, i.e. "Quick Response", is selected by a user.

Back in FIG. 1, the memory unit 14 stores various data and software to be used in the Internet facsimile apparatus 101, and it comprises a hard disk (HDD) or a nonvolatile memory for example.

The network communication unit 15 communicates with an external apparatus connected to the network 102, such as another Internet facsimile apparatus, and it comprises a network interface card (NIC) for example.

The arithmetic processing unit 16 entirely control the processes executed in the Internet facsimile apparatus 101, and it comprises CPU, RAM, ROM, etc. that are not shown in the Figure.

Further in the present embodiment, the arithmetic processing unit 16 also has a function to select and set a response mode either "Quick Response" to send a response right after data reception is completed or "Post-processing Response" to send a response after data printing is completed, when the data sent after DATA command by direct SMTP communication is received via the network communication unit.

The selection and setting of response mode is performed according to an input operation by the user in the operation panel unit 13, i.e., an operation of selecting the response mode by using the "Quick Response mode" selection button 131 or "Post-processing Response mode" selection button 132 shown in FIG. 8, or according to the information contained in the received mail message.

Hereinafter, the difference between the direct SMTP communication mode of the Internet facsimile apparatus 101 and the conventional communication mode will be described with reference to FIG. 2.

Figure 2:
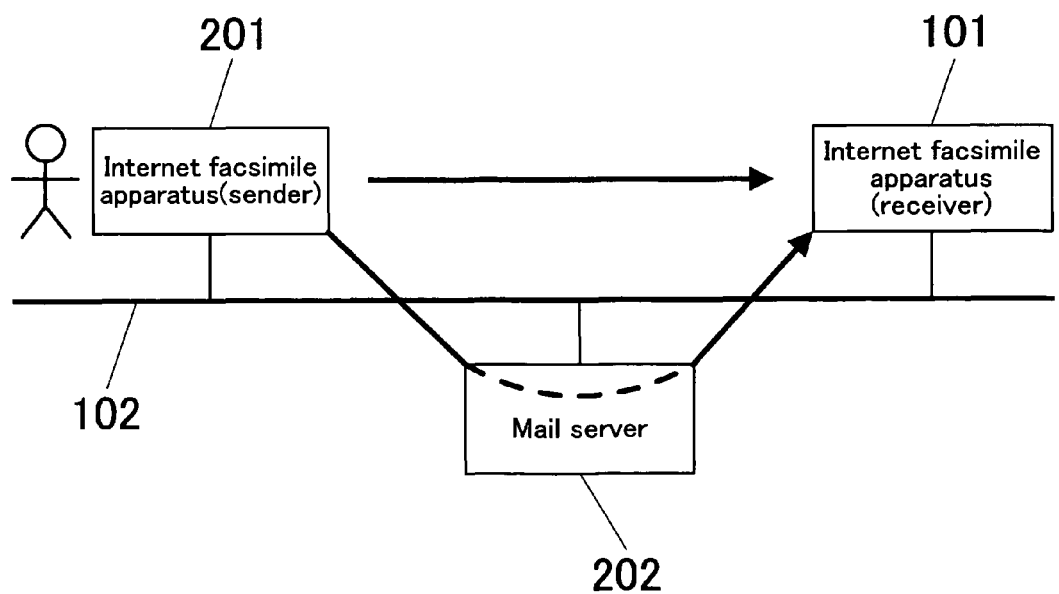
FIG. 2 is a diagram for description between a direct SMTP communication mode used in the Internet facsimile apparatuses and a conventional communication mode.

In FIG. 2, here are the Internet facsimile apparatus 101 as a receiver and another Internet facsimile apparatus 201 as a sender, and the both apparatuses are connected to each other via the network 102 in an embodiment of the present invention.

In communication between conventional Internet facsimiles, a sender Internet facsimile apparatus 201 sends a mail concerning a printing job to a mail server 202, and a receiver Internet facsimile apparatus 101 receives the printing job mail after it confirms that there is a mail delivered to it in the mail server 202. SMTP is used for mail transmission, while a protocol such as POP (Post Office Protocol) 3 or IMAP (Internet Message Access Protocol) 4 is used for mail receipt.

On the other hand, as for direct SMTP communication, a sender Internet facsimile apparatus 201 directly sends/receives data by Direct SMTP to/from a receiver Internet facsimile apparatus 101.

In the direct SMTP communication, there is no time lag due to intervention of the mail server 202 and no need for creating accounts for the Internet facsimile apparatuses 101 and 201 in the mail server 202.

Figure 3:
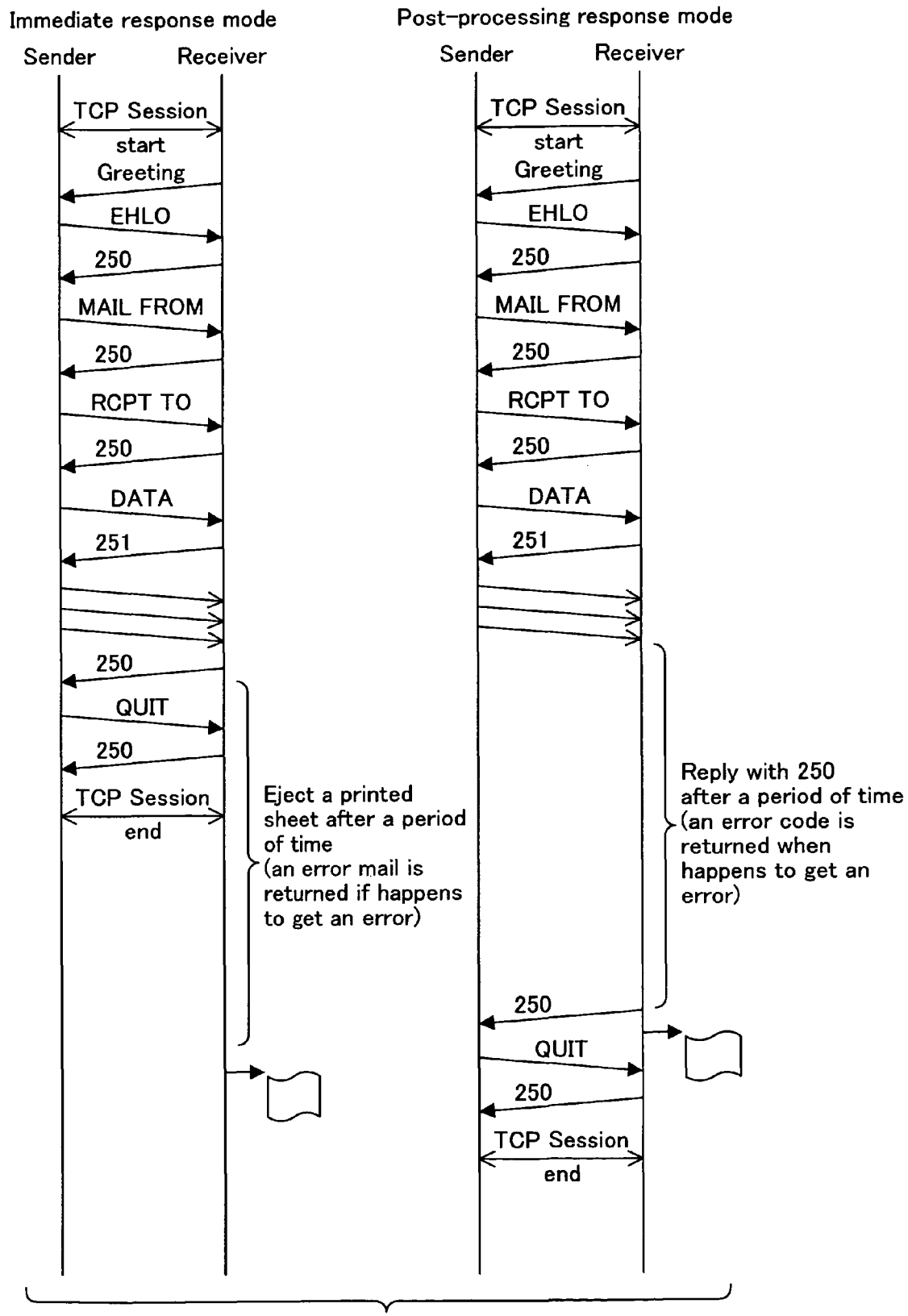
FIG. 3 is a diagram showing a procedure of direct SMTP communication performed between a sender Internet facsimile apparatus and a receiver Internet facsimile apparatus.

FIG. 3 is a diagram showing a procedure of direct SMTP communication performed between a receiver Internet facsimile apparatus 101 and a sender Internet facsimile apparatus 201, and the left chart is for direct SMTP communication in the "Quick Response mode" and the right chart is for that in the "Post-processing Response mode".

According to the left chart of direct SMTP communication in the "Quick Response mode" in FIG. 3, a series of command exchange in SMTP protocol is performed nonstop back and forth between the sender and the receiver to the end.

Specifically, a connection is established between the sender and the receiver and the receiver responds to the sender with "Greeting". Then, the sender sends "HELO/EHLO (return greeting)" command to the receiver, and the receiver responds with "250". And then, the sender sends "MAIL FROM" command specifying the sender to the receiver, and the receiver responds with "250". Further, the sender sends "RCPT TO" command specifying a transfer destination to the receiver, and the receiver responds with "250".

Subsequently, the sender sends "DATA" command to the receiver to request start of data transmission, and the receiver responds with "251". Then, the sender transmits data containing a mail message. Upon completion of storage of the received data in the memory unit14, the receiver responds with "250" to notify the successful data reception. And then, the sender demands "QUIT" command indicating completion, and when the receiver responds with "250", the connection is broken and the communication is terminated.

As mentioned above, upon responding with "250" to notify the successful data reception right after the data reception is completed, the receiver executes a printing process of the received data. And then, a printed sheet is ejected from the printer unit 12 after a period of time.

On the other hand, in the case of "Post-processing Response mode" in the right of FIG. 3, the same procedure in the "Quick Response mode" is repeated until the sender sends "DATA" command to request start of data transmission and the data including a mail message is sent to the receiver. However, the communication is temporarily shut down for a certain period of time between data reception and response with "250" indicating successful reception by the receiver. The receiver performs data decoding (decryption) and printing during the period, and the receiver responds to the sender with "250" after decoding or printing is completed.

If the process happens to get an error, the receiver responds with an error code such as "4XX" or "5XX".

In the "Quick Response mode", the Internet facsimile apparatus 101 needs to comprise a high-capacity recording unit such as HDD in which the received data can be spooled, but the communication is completed in a short period just like communication with a mail server in the conventional communication method. Thus, the sender has a lower possibility to get a timeout. If there is an error in decoding or printing, it is necessary to notice the error separately with an error mail instead.

On the other hand, the "Post-processing Response mode" is similar in concept to G3 FAX, because the user knows that success of communication means success of printing.

However, the period needed for decoding and printing is significantly longer than that in SMTP communication by using a conventional mail server, resulting in higher possibility of the timeout of the sender. In addition, the mode is not compatible with "multisession", simultaneous connection to multiple clients, and it is difficult to receive multiple pieces of data at the same time.

Hereinafter, the procedure of the Internet facsimile apparatus 101 in this embodiment when it receives an image data (referred to also as job data) sent from the sender Internet facsimile apparatus 201 shown in FIG. 2 by direct SMTP communication will be described with reference to the flowchart shown in FIG. 4. In this embodiment, one of the response modes is chosen by the user, as an "Quick Response mode" button 131 or a "Post-processing Response mode" button 132 in the display screen of the operation panel unit 13 shown in FIG. 8 is pushed. The processing is executed by operation of the CPU in the arithmetic processing unit 16 according to the program stored in the memory unit 14.

Figure 4:
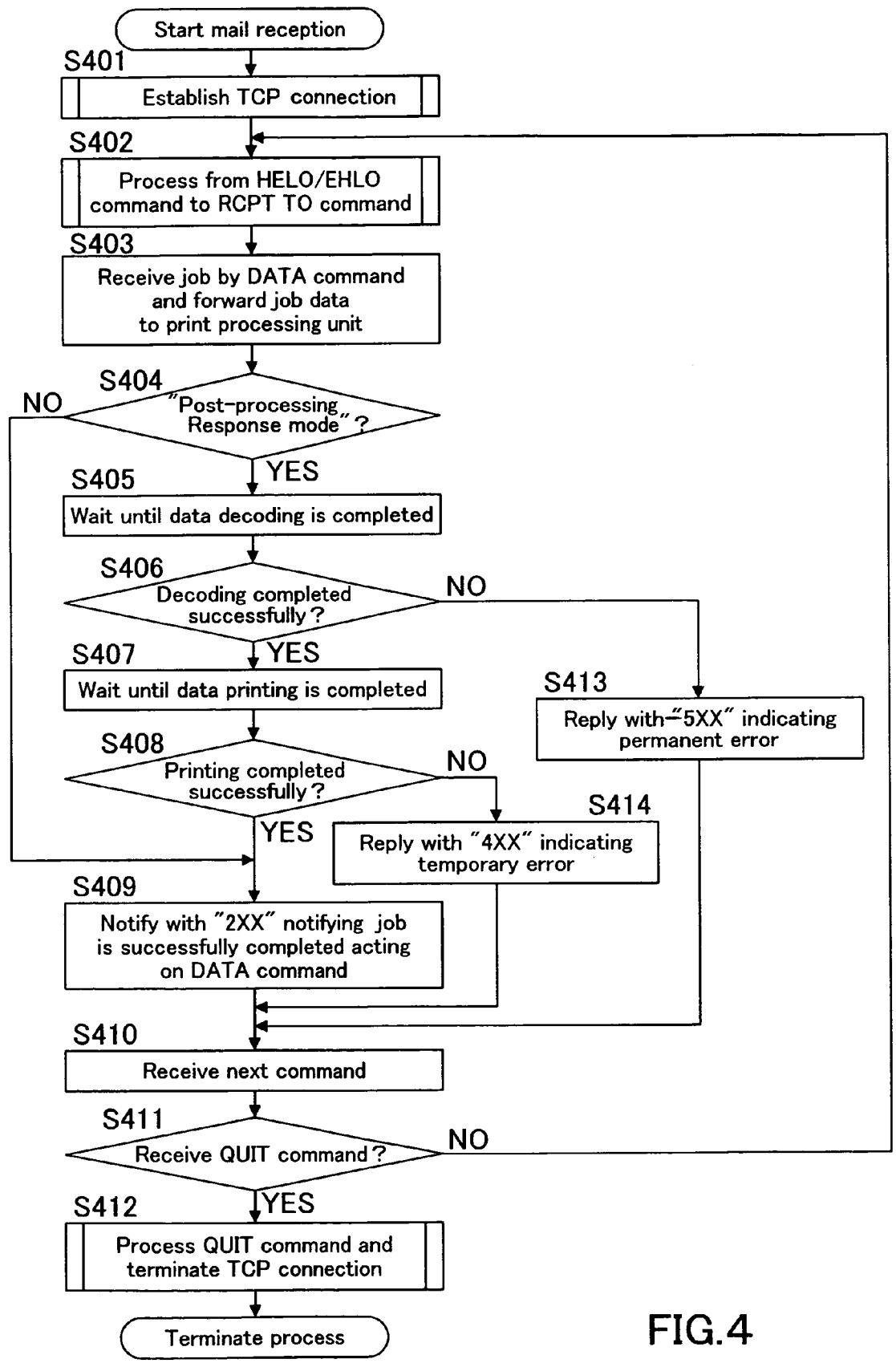
FIG. 4 is a flowchart showing a procedure of a receiver Internet facsimile apparatus for receiving data transmitted by direct SMTP from a sender Internet facsimile apparatus.

In FIG. 4, upon reception of a connection request from the sender apparatus 201, TCP connection is established in step S401, and a series of SMTP communication processings from the "HELO/EHLO" command to the "RCPT TO" command described in FIG. 3 are performed in step S402.

In step S403, the image data (job data) are received by the DATA command, and the job data are transferred to the print processing unit for printing. The print processing unit means a software-like control module that performs decoding and printing, and is equivalent to the printer unit 12 and the arithmetic processing unit 16 in FIG. 1.

Then in step S404, it is judged whether the timing of the response on image data reception after DATA command is set to the "Post-processing Response mode". If it is not set to the "Post-processing Response mode" (NO in step S404), the procedure advances to step S409, in which the receiver apparatus responds with a 2XX command, indicating that the processing acting on the DATA command is completed normally. If the timing of the response on image data receipt after DATA command is set to the "Post-processing Response mode" (YES in step S404), in step S405, the procedure waits until the received job data are decoded.

In step S406, it is judged whether the decoding is completed normally; and, if decoding is completed normally (YES in step S406), the receiver apparatus waits until the job data are printed in step S407, and the procedure advances to step S408. If decoding is not completed normally (NO in step S406), it is judged, for example, that it is an error by receiving a false mail other than the facsimile job data; in step S413, a message 5XX error indicating a permanent error is sent to the sender; and the procedure advances to step S410.

In step S408, it is judged whether the printing is completed normally; if printing is completed normally (YES in step S408), a message 2XX command indicating the processing according to the DATA command is completed normally is sent in step S409; and the procedure advances to step S410. If printing is not completed normally (NO in step S408), it is judged, for example, that it is because of a temporal factor such as "no paper available"; in step S414, a message 4XX error indicating a temporal error is sent; and the procedure advances to step S410.

In step S410, the receiver apparatus receives the next command. After completion of reception of most data, it is judged whether a QUIT command from the sender is received in step S411, and, if the QUIT command is received (YES in step S411), TCP connection is broken according to the QUIT command in step S412. If there is no QUIT command (NO in step S411), the procedure goes back to step S402.

Thus in the Internet facsimile apparatus 101 of the present embodiment, when the image data sent by direct SMTP communication after DATA command is received through the network communication unit 15, an "Quick Response mode" or a "Post-processing Response mode" is selected and set easily by input operation by the user. Thus, for example because the response mode is selected according to the sender's response mode, it is possible to perform communication without a sense of incompatibility. It is also possible to cope with various environments of users, for example, of the users who emphasize multisession and who emphasize completion of printing in one session, and thus, to improve the efficiency in use.

The arithmetic processing unit 16 can harmonize itself with the sender, by analyzing a keyword concerning response mode contained in the received data and selecting the response mode automatically.

Figure 5:
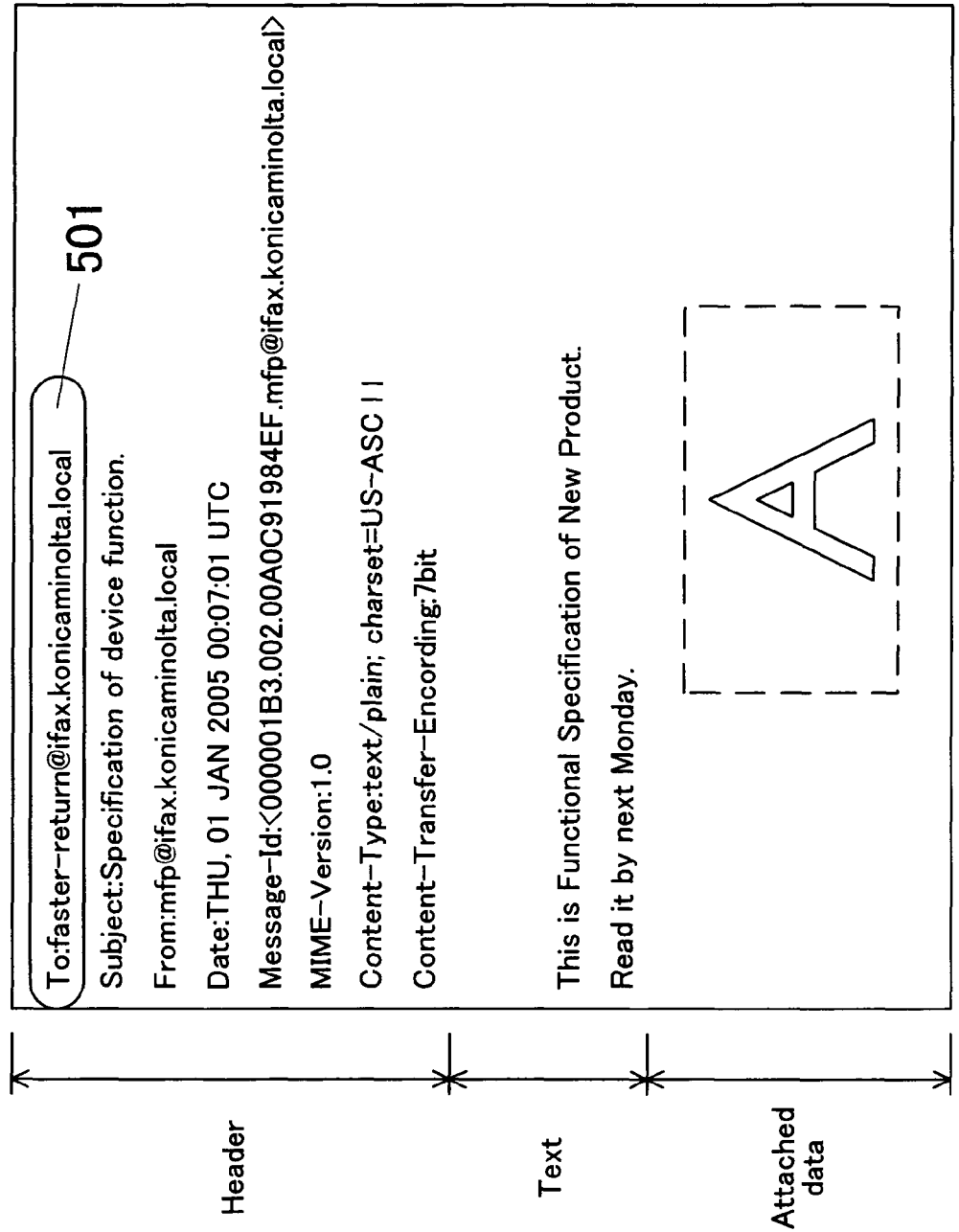
FIG. 5 is a diagram showing an example of the information for switching a response mode written in the header field of a mail message.

FIG. 5 shows an example of the received data containing a keyword concerning response mode.

The received data shown in FIG. 5 includes a mail message consisting of a header and a text and image data attached thereto, and the keyword for the receiver Internet facsimile apparatus 101 to switch its response mode according to the sender is written in an arbitrary field of the mail message, for example, in the header field.

In communication among Internet facsimiles via a mail server, essential information indicating destination is normally written in the "To:" field 501 of the message shown in FIG. 5. However, in direct SMTP communication, a sender Internet facsimile apparatus and a receiver Internet facsimile apparatus communicate directly with each other, and thus, the "To:" field does not have its original implication.

If a keyword "faster-return" requesting the "Quick Response mode" is written in the "To:" field 501, the receiver Internet facsimile apparatus 101 can select and set the "Quick Response mode" by analyzing the mail message and detecting the keyword.

Accordingly, for example, if the sender apparatus operates in the "Quick Response mode", a keyword "faster-return" is written in the "To:" field 501, and if the sender apparatus operates in the "Post-processing Response mode", a keyword "result-return" requesting the "Post-processing Response mode" is written there; and in this way, it is possible to communicated with conventional apparatuses without a sense of incompatibility.

Figure 6:
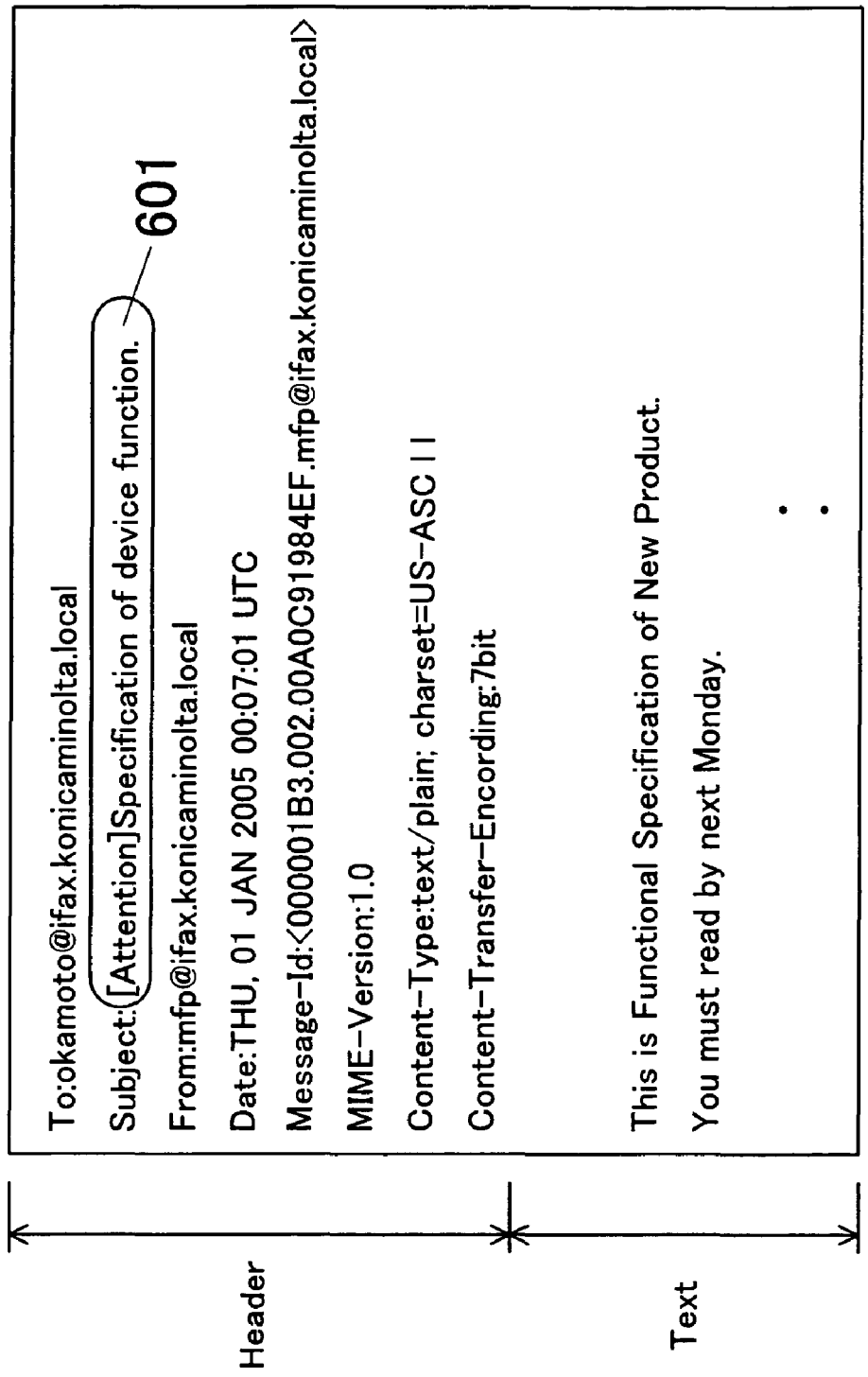
FIG. 6 is a diagram showing another example of the information for switching a response mode written in the header field of a mail message.

FIG. 6 shows another example of the received data, and only the mail message region consisting of header and text is shown.

Similarly to that in FIG. 5, the received data shown in FIG. 6 contains a keyword for switching the response mode according to the communication counterpart in an arbitrary field of mail message, for example, in the header field.

The "subject:" field 601 in the mail message shown in FIG. 6 starts with a keyword "[Attention]" indicating that the data is important. The receiver Internet facsimile apparatus 101 analyzes the mail message, detects the keyword, and switches the response mode to the "Post-processing Response mode" automatically to inform the sender that the data are received surely.

That is, when the data is judged important from the keyword attached thereto, the response mode is switched automatically to the "Post-processing Response mode", and thus, the sender can recognize that the transmitted important data are printed surely.

Figure 7:
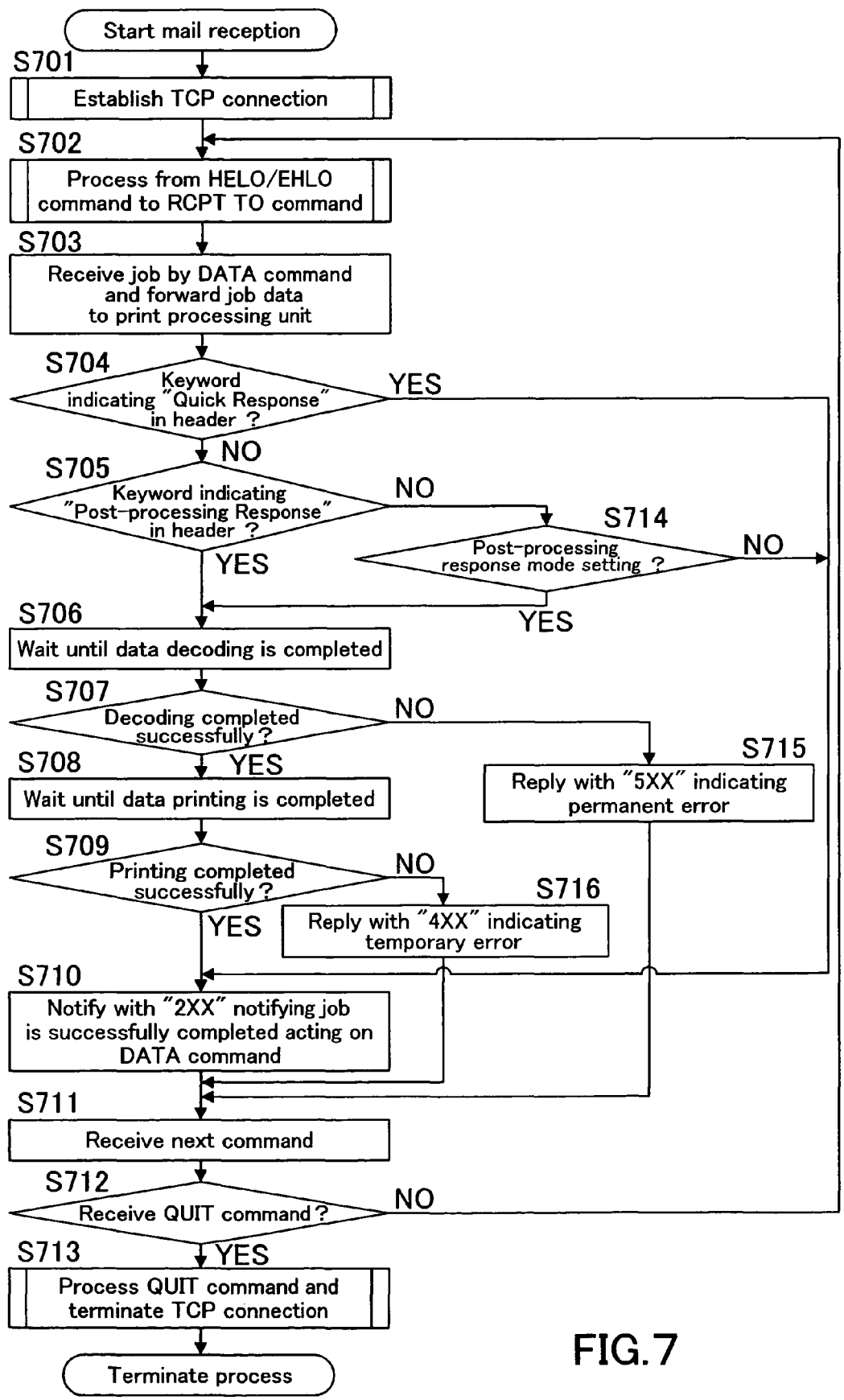
FIG. 7 is a flowchart showing a procedure for analyzing the header field of e-mail and switching the response mode.

FIG. 7 is a flowchart showing the procedure for the Internet facsimile apparatus 101 to analyze the header field of mail message and switch the response mode. The processing is executed by operation of the CPU of the arithmetic processing unit 16 according to the program stored in the memory unit 14.

The flowchart is different from the flowchart of FIG. 4, in that the Internet facsimile apparatus 101 analyzes the header field of mail massage and examines whether there is a keyword indicating the "Quick Response mode" or the "Post-processing Response mode" during reception of the data transmitted from the sender after DATA command (steps S704 and 705).

When a connection request is received from a sender apparatus 201 in FIG. 7, TCP connection is established in step S701, and a series of SMTP communication processings from "HELO/EHLO" command to "RCPT TO" command are performed in step S702, In step S703, job data are received by DATA command, and the job data are transferred to the print processing unit for printing.

Subsequently in step S704, the header field of mail massage is analyzed, and it is judged whether there is a keyword indicating the "Quick Response mode"; if there is a keyword indicating the "Quick Response mode" (YES in step S704), the procedure advances to step S710 and the receiver apparatus responds with 2XX command indicating that the processing according to the DATA command is completed normally. If there is no keyword indicating the "Quick Response mode" (NO in step S704), the procedure advances to step S705.

The header field of mail massage is analyzed in step S705; it is judged whether there is a keyword indicating the "Post-processing Response mode"; if there is a keyword indicating the "Post-processing Response mode" (YES in step S705), the receiver apparatus waits until the job is decoded in step S706. If there is no keyword indicating the "Post-processing Response mode" (NO in step S705), the procedure advances to step S714.

In step S714, it is judged whether the setting according to the user's input operation is in the "Post-processing Response mode", and, if the response mode is the "Post-processing Response mode" (YES in step S714), the procedure advances to step S706. If the response mode is the "Quick Response mode" (NO in step S714), the procedure advances to step S710.

In step S707, it is judged whether decoding is completed normally; if the decoding is completed normally (YES in step S707), the receiver apparatus waits until the job is printed in step S708, and the procedure advances to step S709. If the decoding is not completed normally (NO in step S707), it is judged, for example, that it is an error by receiving a false mail other than the facsimile job data; the receiver apparatus sends a response 5XX error indicating a permanent error to the sender in step S715; and the procedure advances to step S711.

In step S709, it is judged whether printing is completed normally; if printing is completed normally (YES in step S709), the receiver apparatus sends the 2XX command indicating that the processing acing on DATA command is completed normally in step S710; and the procedure advances to step S711. If the printing is not completed normally (NO in step S709), it is judged that it is a temporal error such as, for example, "no paper available"; the receiver apparatus sends a message 4XX error indicating a temporal error in step S716; and the procedure advances to step S711.

In step S711, the receiver apparatus receives the next command. After completion of reception of most data, it is judged whether the sender's QUIT command is received in step S712; and if the QUIT command is received (YES in step S712), the QUIT command is executed in step S713; and the TCP connection is terminated. If the QUIT command is not received (NO in step S712), the procedure goes back to step S702.

In this manner, the receiver Internet facsimile apparatus 101 analyzes received data and selects and sets a suitable response mode automatically, and thus, such a system is extremely superior in efficiency in use and convenient.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An Internet facsimile apparatus, comprising:
a network communication unit for communicating with an external apparatus in direct SMTP via a network;
a printing unit for printing image data received through said network communication unit from the external apparatus; and
a response mode selecting unit for selecting between setting a first response mode to send a response right after image data reception acknowledging successful reception of the image data sent by direct SMTP communication through said network communication unit, and setting a second response mode to shut down communication with the external apparatus until image data printing is completed and to send a response after image data printing is completed acknowledging successful reception of the image data when image data sent by direct SMTP communication is received through said network communication unit.

2. The Internet facsimile apparatus as recited in claim 1, further comprising an operation unit for allowing the user to manually select one of the first response mode and the second response mode.

3. The Internet facsimile apparatus as recited in claim 1, wherein the response mode selecting unit selects/sets a response mode according to the information contained in the received data.

4. The Internet facsimile apparatus as recited in claim 3, wherein the information contained in the received data indicates either the first response mode or the second response mode.

5. The Internet facsimile apparatus as recited in claim 3, wherein the information contained in the received data indicates that the received data is important.

6. The Internet facsimile apparatus as recited in claim 1, wherein image data is transmitted from the external apparatus after a DATA command.

7. A communication processing method, comprising the steps of:
communicating with an external apparatus in direct SMTP via a network;
printing image data received from the external apparatus by the direct SMTP communication; and
selecting between setting a first response mode to send a response right after image data reception acknowledging successful receipt of the image data sent by direct SMTP communication, and setting a second response mode to shut down communication with the external apparatus until image data printing is completed and to send a response after image data printing is completed acknowledging successful reception of the image data when image data sent by direct SMTP communication is received.

8. The communication processing method as recited in claim 7, wherein the first response mode or the second response mode is set according to a manual input operation by the user in an operation unit in the step of response mode selection.

9. The communication processing method as recited in claim 7, wherein a response mode is set according to the information contained in the received data in the step of response mode selection.

10. The communication processing method as recited in claim 9, wherein the information contained in the received data indicates either the first response mode or the second response mode.

11. The communication processing method as recited in claim 9, wherein the information contained in the received data indicates that the received data is important.

12. The communication processing method as recited in claim 7, wherein image data is transmitted from the external apparatus after a DATA command.

13. A nontransitory computer readable medium encoded with a communication processing program for making a computer execute the steps of:
communicating with an external apparatus in direct SMTP via a network;

printing image data received from the external apparatus by the direct SMTP communication; and selecting between setting a first response mode to send a response right after image data reception acknowledging successful receipt of the image data sent by direct SMTP communication, and setting a second response mode to shut down communication with the external apparatus until image data printing is completed and to send a response after image data printing is completed acknowledging successful reception of the image data when image data sent by direct SMTP communication is received.

14. The communication processing program as recited in claim 13, for making a computer set either the first response mode or the second response mode according to a manual input operation by the user in an operation unit in the step of response mode selection.

15. The communication processing program as recited in claim 13, for making a computer set a response mode according to the information contained in the received data in the step of response mode selection.

16. The communication processing program as recited in claim 15, wherein the information contained in the received data indicates either the first response mode or the second response mode.

17. The communication processing program as recited in claim 13, wherein the information contained in the received data indicates that the received data is important.

18. The communication processing program as recited in claim 13, wherein image data is transmitted from the external apparatus after a DATA command.

* * * * *